Dec. 1, 1970 K. L. AGNEW 3,544,402
PHOTOGRAPHIC REPRODUCTION BY DISCRETE INTERSECTING
RAYS WITH COMPRESSION IN THE THIRD DIMENSION
Filed Dec. 18, 1967

United States Patent Office 3,544,402
Patented Dec. 1, 1970

3,544,402
PHOTOGRAPHIC REPRODUCTION BY DISCRETE INTERSECTING RAYS WITH COMPRESSION IN THE THIRD DIMENSION
Kenneth Leslie Agnew, Falconbridge, Ontario, Canada, assignor to The Battelle Development Corporation, Columbus, Ohio
Filed Dec. 18, 1967, Ser. No. 691,553
Claims priority, application Canada, June 2, 1967, 992,034
Int. Cl. B44b 1/02; B44c 3/06
U.S. Cl. 156—58　　　　　　　　　　　　　　　5 Claims

ABSTRACT OF THE DISCLOSURE

This invention relates to a method of recording and reproducing the appearance of the shape of three-dimensional objects by means of contour lines, which, on reprojection, at points of simultaneous intersection, photographically reproduce the recorded shape, compressed in depth, so that the original scene may be reproduced within a relatively shallow depth of space, yet still provide the appearance of a three-dimensional view, by means of a bas-relief effect. At least one of the rays projected to produce a contour line is modulated to provide for variations in shade or color. In the limiting case of complete compression, two or more non-adjoining rays may intersect simultaneously, with no ray originating from a contour line, but merely one or more modulated to produce differences in shade or color in a two-dimensional plane within the space occupied by a transparent differentially-photosensitive material.

CROSS REFERENCES TO RELATED APPLICATIONS

This invention is related to that outlined in continuation-in-part application, Ser. No. 424,433, filed Jan. 8, 1965, under the title "Photographic Reproduction in Three Dimensions" and now Pat. No. 3,399,993.

BACKGROUND OF THE INVENTION

Field of the invention

In general the field covered is the replication of appearance of a three-dimensional view, with the nearer objects especially appearing to be in three dimensions on replication, by means of successively projected sets of simultaneously intersecting contour lines, which have previously been recorded, in which the points of intersection along each line of intersection are compressed, in the dimension normal to the view, with respect to other points representing different depths of view on the same contour line or other contour lines. The lines of intersection are inside the space occupied by a transparent differentially-photosensitive material which is activated to produce visible effects only at the lines of intersection, and by the compression of the replicated view of bas-relief effect requires only a limited depth of photosensitive material rather than depth proportional to the other two dimensions, required if there is no compression. The limiting case does not necessitate contour lines, but merely modulation of one or more line(s) of each set of intersecting lines, from non-adjoining sources, to provide variations in shade and color to produce a two-dimensional view inside the space occupied by a transparent differentially-photosensitive material.

Description of the prior art

Holograms and stereoscopic projections are, as far as I know, the only other methods of producing three-dimensional replication. The use of discrete intersecting rays guided by contour lines to produce replication of shape in true three dimensions is described in the above-mentioned continuation-in-part application.

SUMMARY OF THE INVENTION

Lines are projected to impinge on a three-dimensional scene, and the resulting reflected lines, distorted by the three-dimensional scene, are recorded by a recording device, which is not coaxial with the projector. These originally projected lines must be at an appreciable angle to the planes of the V containing the projecting device, scene scanned and recording device (or devices) in order to be appreciably distorted by variations in depth of the scene. When the reflected lines from each originally projected line are reprojected to intersect simultaneously with each other, and/or with an undistorted line coaxial with the original projector, inside a transparent differentially-photosensitive material, and when this is done successively with each set from an originally projected line, the shape of the original scene is reproduced, as taught in the above-mentioned continuation-in-part application. At approximately the same time as the lines are projected, the scene is scanned, as in television, for variations in shade or color, preferably by a receiver in approximately the same position as the original projector. These recorded variations are used to modulate one or more of the reprojected lines to produce corresponding variations at the lines of intersection inside the transparent differentially-photosensitive material. Additionally, as it would often be impossible to reproduce a scene in true depth, the points of intersection along the lines of intersection are compressed, usually in relation to the frontal plane, in proportion to their distortion, so that a bas-relief effect is produced which gives an appearance of true three dimensional replication. In the limiting case, where the bas-relief effect compresses into a two-dimensional plane, no projection for distortion to produce contour lines is required, but merely scanning for shade or color, and two or more lines, at least one of which is modulated as to wave length or intensity, are projected to intersect in a plane inside the transparent differentially-photosensitive material, from non-adjoining sources.

DESCRIPTION OF THE PREFERRED EMBODIMENTS

As a preface, the following first recapitulates the foundation laid in the above-mentioned invention.

Figure 1:
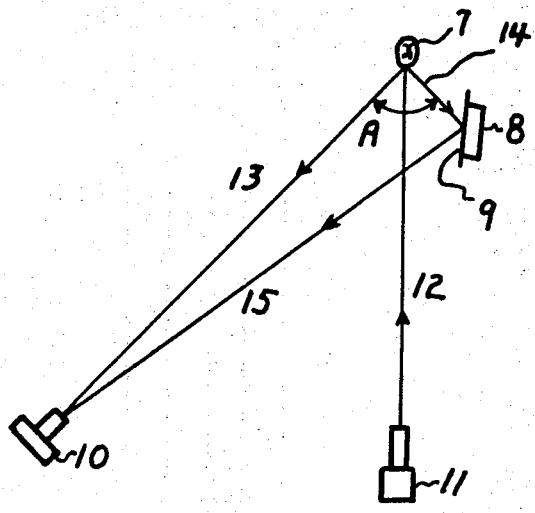
FIG. 1 is a diagrammatic plan of an arrangement used to obtain a record of the contour lines.

Referring first to FIG. 1, 11 is a projector throwing an image of a line along a path 12 on to the shape to be reproduced 7, in this case a tilted football. The image of the line on the football is recorded by path 13 direct to the camera 10, and also by path 14, at angle A to path 13, to the mirror 9, supported by stand 8, and thence by path 15 to the camera 10. Instead of the mirror, of course, another camera may be set up on an extension of path 14, to record directly. Also, more than two cameras or one mirror may be used, with the path of each recording image at an angle to all the others, to give more than two views, and thus intensify the contrast at the line of intersection when reprojected as described below; in some cases only one record, or camera, is required, as is also mentioned below.

Figure 2:
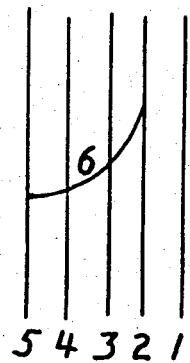
FIG. 2 is a view of six lines which were projected on to the shape to be reproduced.
Figure 3:
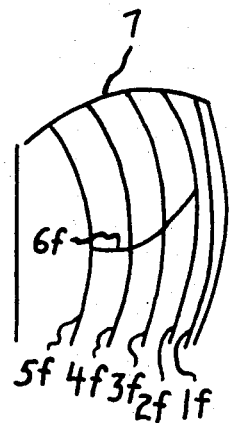
FIG. 3 is a composite record of the six resulting contour lines, together with a partial outline of the shape to be reproduced, as viewed directly by the camera.
Figure 4:
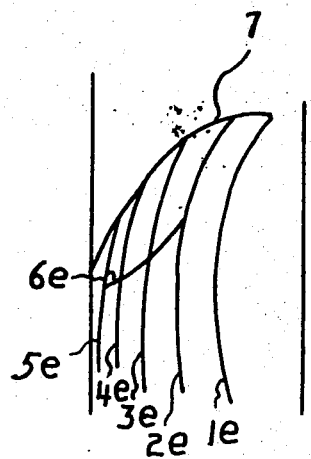
FIG. 4 is a composite record of the six resulting contour lines, together with a partial outline of the shape to be reproduced, as viewed in a mirror at a different angle to that in FIG. 3, reversed to compensate for the reversal of the mirror image, and enlarged to the same scale as FIG. 3.

1, 2, 3, 4, 5 and 6, FIG. 2, are lines which may be projected and viewed successively, or simultaneously if a tracing device with coupled reprojector is used, shown as a composite, and FIGS. 3 and 4 are, respectively, composites of the direct view and the view via the mirror of the projected and recorded lines 1, 2, 3, 4, 5 and 6, on the football. FIG. 4 is shown reversed to correct for the mirror reversal, and is so reprojected. In this illustration, the few lines are shown widely spaced, but in practical application many would normally closely adjoin or overlap each other.

Figure 5:
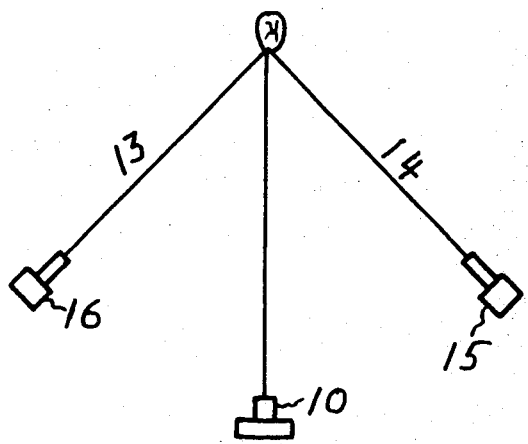
FIG. 5 is a diagrammatic plan of an arrangement used to reproject the images of the contour lines on to the original shape, for illustrative purposes.
Figure 6:
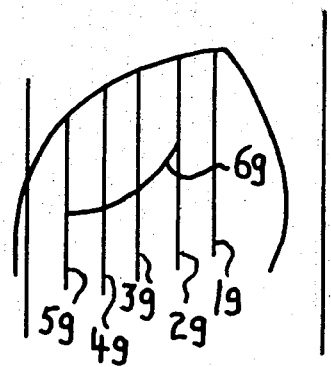
FIG. 6 is a composite record of the reprojected views shown in FIGS. 3 and 4, when properly intersecting on the shape, together with a partial outline of the shape.
Figure 7:
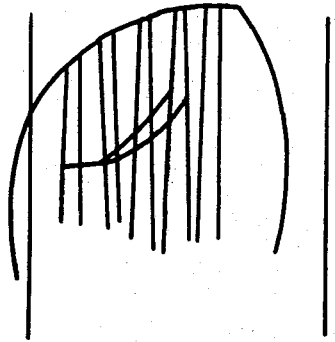
FIG. 7 is a composite record, similar to that in FIG. 6, but with the shape slightly out of the position where the reprojected sheets of energy intersect.

FIGS. 5, 6 and 7 demonstrate the reprojection of the contour lines, shown in FIGS. 3 and 4. In this case, for example, contour line 1f from FIG. 3 was projected by projector 16, FIG. 5, along the same path 13, and on to the same football 7, as was shown in FIG. 1. Simultaneously contour line 1e, FIG. 4, was projected by projector 15, FIG. 5, along the same path 14, and onto the same football 7, as are shown in FIG. 1. When properly intersecting they coincide as one line 1g, FIG. 6, similar to that originally recorded as in FIG. 1. FIG. 6 is a composite reproduction made in similar fashion from the successive reprojections of the pairs of lines shown in FIGS. 3 and 4, to produce 1g, 2g, 3g, 4g, 5g, and 6g where they intersect as shown in FIG. 6.

It is obvious, from the above, that one of each set of reprojected contour lines may be the originally projected line, used without preliminary two-dimensional replication, as, if projected into the transparent differentially-photosensitive material at the same angle as the original line was projected for primary record, the sheet of projection would have the same cross-sectional shape as if it was the photographed by a camera superimposed on projector 11, FIG. 1, and then the photographed line reprojected by a projector at the same position as the camera 10, FIG. 5, assuming this camera has the same relative position to lines 13 and/or 14 as projector 11, FIG. 1. Indeed, in the usual case of the original projections being straight lines, no difficulties regarding enlargement or reduction of size of these lines arises, to co-ordinate with the lines emitted by, say, projectors 15 and/or 16, FIG. 5. This is clearly shown by reference to the reproduction of straight lines in FIG. 6, by reprojection of lines 1f to 5f, FIG. 3, and 1e to 5e, FIG. 4, and which was viewed at the same angle as the original straight contour lines 1 to 5, FIG. 2, were projected.

Projection of lines is described, but these lines may be considered to be shortened to the length of a dot, although this would often be an inefficient method. Similarly a series of dots or dashes can be considered a line, even though it is discontinuous. The size of lines may be varied in reproduction, providing similarity of shape and relative position to each other are maintained.

FIGS. 8 to 11 clarify the basic method further. Consider the transparent differentially-photosensitive material 17 as a plastic, which, at 10° C. above the ambient temperature, becomes opaque, and that all rays entering the plastic are of sufficient energy, and the absorption coefficient of the plastic is such that for the first inch of penetration, during the unit of time of exposure, the temperature in the path of each ray is raised about 5° C., and 4½° C. for the second inch, et cetera (actually $I = I_0 e^{-kt}$).

Figure 8:
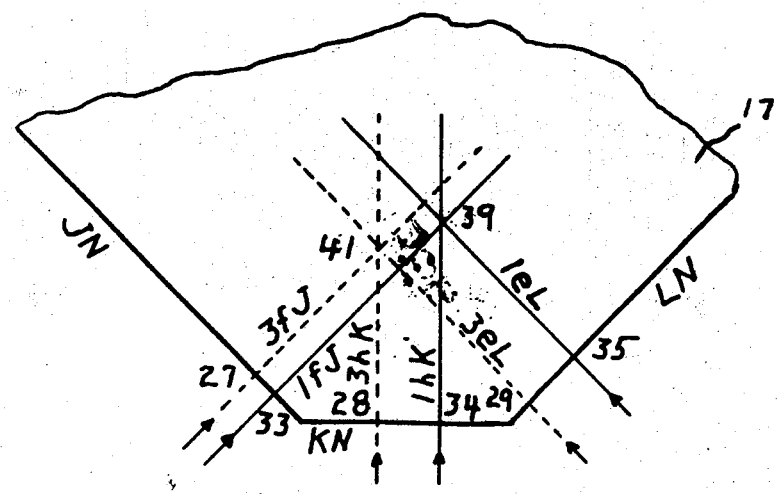
FIG. 8 is a portion of a section of a transparent differentially-photosensitive material with rays of reprojected energy drawn to intersect at points on the reproduced contour line.
Figure 9:
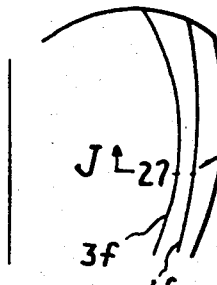
FIG. 9 is a view of the shape to be reproduced, in outline, with two contour lines superimposed.
Figure 10:
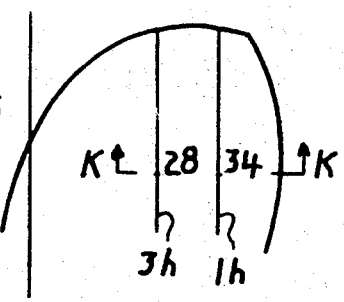
FIG. 10 is another view of the shape to be reproduced, in outline, with two contour lines superimposed, taken from a different angle than the view shown in FIG. 9.
Figure 11:
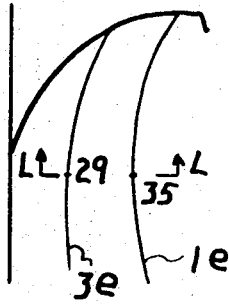
FIG. 11 is a third view of the shape to be reproduced, in outline, with two contour lines superimposed, taken from a different angle than the views shown in FIGS. 9 and 10.

Consider that FIG. 9 is a reflective surface, except for lines 1f and 3f, and is pasted to face JN as shown in FIG. 8, so that section J—J appears at the level of FIG. 8; and similarly FIG. 10 is pasted to face KN, and FIG. 11 to face LN. Now if lines 3f, 3h and 3e are blanked out, and the three faces are illuminated normally by parallel rays from the three directions shown (preferably with coherent light to decrease side effects due to diffraction on passage through the slits 1f, 1h and 1e), the three rays 1fJ, 1hK and 1eL will pass through the corresponding slits 1f, 1h and 1e at the corresponding points 33, 34 and 35, at the level of the section shown in FIG. 8, each one heating the plastic by about 4½° C. as they near the point of intersection. However, at their point of intersection, 39, their effect is cumulative, causing an elevation of temperature of about 13½° C. at this point only, and therefore creates an opaque spot at 39 only, under the given conditions, and so for all the line where the rays from 1f, 1h and 1e intersect, within the transparent differentially-photosensitive material 17.

Now, if the first line of intersection is allowed to cool, slits 1f, 1h and 1e are blanked out, and slits 3f, 3h and 3e are uncovered, and rays, as above, projected through them simultaneously, a second opaque line, including point 41, FIG. 8, by rays 3fJ, 3hK and 3eL passing through the respective points 27, 28 and 29, will be produced within the transparent differentially-photosensitive material 17.

By originally projecting a sufficient number of lines, as partially indicated in FIGS. 1 and 2 of my application, and obtaining corresponding multiangular views of each line, a curved surface may be built up within the transparent differentially-photosensitive material, by the adjacent lines of intersection. The reprojections may be of lines as a whole, or pencils of energy drawn along the lines to sweep out the sheets of energy.

It may be possible, in some cases, to reproject widely separated sets of lines simultaneously, if the separation is such that the intersecting sheets do not interfere as described at simulaneous times, and the degree of necessary separation depends on the magnitude of the angle between component sheets of projection of a set. In effect, this means that separated areas being reproduced may be formed by sequential build-up of each area, simultaneously in the different areas, if points of intersection from the different areas do not interfere with the desired surface.

The out-of-position projection of lines in FIG. 7, where the lower portion of line 6, shown as coinciding, illustrates that projected lines must be at an appreciable angle to the plane containing the projectors, cameras and object in any particular view.

Figure 12:
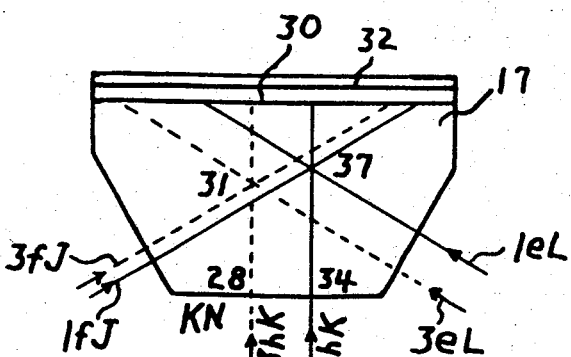
FIG. 12 is a section of a transparent differentially-photosensitive material, similar to that shown in FIG. 8, but with the points in a vertical line in the plane of the paper, compressed with respect to each other.

In the description above, it is intimated that the lines must be projected, or used, as masks with parallel beams of light, and therefore must probably be widely enough separated in the recording to permit their successive projection, through the recording medium, after adjustment on recording and re-adjustment on reprojection. This is not so, as narrow bands, for instances, may be originally projected simultaneously on to the object, and the resulting contour lines recorded on one record of each view. These adjacent lines may then be used as guide lines for a tracing device attached to a device outside the area of the recording, emitting a pencil of energy, such as a laser, and two or more pencils of energy drawn along, guided by two or more of the equivalent contour bands of a set recorded in two or more views. As pointed out, one of the views may be a virtual one, consisting of the originally projected lines, altered in size to that of the other recording, if necessary. Phrases such as "multiple secondary lines" and "more than one different angles," are intended to include the case described where only one view is recorded as secondary lines, and the other view is that of lines similar to those originally projected on the object whose shape is to be reproduced. The two or more pencils of energy will be drawn along the sheets of projection, with the sheets distorted, if necessary, as described below, so that they occupy the same section simultaneously; for instance, pencils of light 3fJ, 3hK and 3eL would be projected at the section represented by FIG. 8, simultaneously, with the coupled tracing device at point 27, FIG. 9; point 28, FIG. 10; and point 29, FIG. 11. Similarly, when three tracing devices were at points 33, 34 and 35 of recordings shown as FIGS. 9, 10 and 11, the corresponding pencils of energy would be projected along paths 1fJ, 1hK and 1eL at the section shown in FIG. 8, but compressed with respect to the previous point, as shown in FIG. 12.

By differentially-photosensitive solid is meant a material which is affected by radiation above a certain threshold of intensity, or in which a synergistic action produces a significant effect with two or more different types of radiation (some photosensitive glasses are fifty times as sensitive to nucleation by ultra-violet light as their temperature is raised, as, for instance, by infra-red radiation), but in which no significant effect results below this threshold, or in the absence of a synergistic effect from simultaneous exposure to different radiation. By transparent is meant a material capable of absorbing sufficient of the radiant energy producing the image to be activated above a certain threshold of intensity or synergism, and with a transparency to this radiant energy sufficient to ensure that at the point of simultaneous intersection of the rays the activating energy will be significantly greater than at any other point in the path of other radiation in the photosensitive solid. The invention is not to be considered to be restricted to recording and reprojecting visible light, but is intended to apply to any radiation which may be projected as a narrow beam to produce a significant photo effect, at the points or lines of simultaneous intersection only, within the space occupied by the transparent differentially-photosensitive material, which is, or may be made, visible.

By "simultaneous" is meant that time within which the desired cumulative or synergistic effect occurs; for instance, if increase of absorbed heat produces the effect, one radiator could operate slightly out of phase in time with the other, as long as the heat from one did not leak away before the heat added by another radiator produced the desired effect.

If radiant energy is projected through a lens it is preferable that a lens with a narrow angle of radiation be used, so that there will be negligible divergence or convergence of the rays, and all parts of a pencil or sheet of radiated energy will be substantially parallel, thereby obviating effects due to undesired dispersion and refraction. In other words, no focussing of an individual ray should ideally be necessary, but merely adjustment so that the rays intersect at the original angle and at the same position with respect to each other, with proportional distortion where necessary, as they did when originally impinging on the shape being reproduced photographically.

Two methods have been described, one in which individual lines are projected onto the object and one set of the resulting contour lines recorded for direct reprojection or as guides for tracers with coupled projectors; the other in which multiple closely spaced bands were projected on the object and resulting sets of multiple contour lines used to guide tracers with coupled projectors. Where automatic tracers are used, the first method is readily applicable, but complex shapes causing discontinuities in the lines might create difficulties in the use of the second method. In this case it may be more economical to project a group of widely-separated lines onto the object, and record the resulting sets of contour lines; followed by projection of another group of widely-spaced lines on the object and covering areas in between the first group, and subsequent recording; with continuation of the process to cover the entire area to be reproduced.

Instead of being coupled directly to a projector, the information from the tracer may be fed to an intervening mechanism (such as magnetic tape) and computer for subsequent control of reproduction, and the tracer may itself record directly the location of an originally projected line or spot of light on the original view.

While the above description is based on the production of a permanent or semipermanent record in three dimensions, if a transparent material, liquid, solid or gaseous, is used which will fluoresce or become opaque transitorily at the line of intersection of projected rays, but not elsewhere, this method may be used to produce three-dimensional motion pictures, by the use of these multiple recordings and reprojections.

Figure 13:
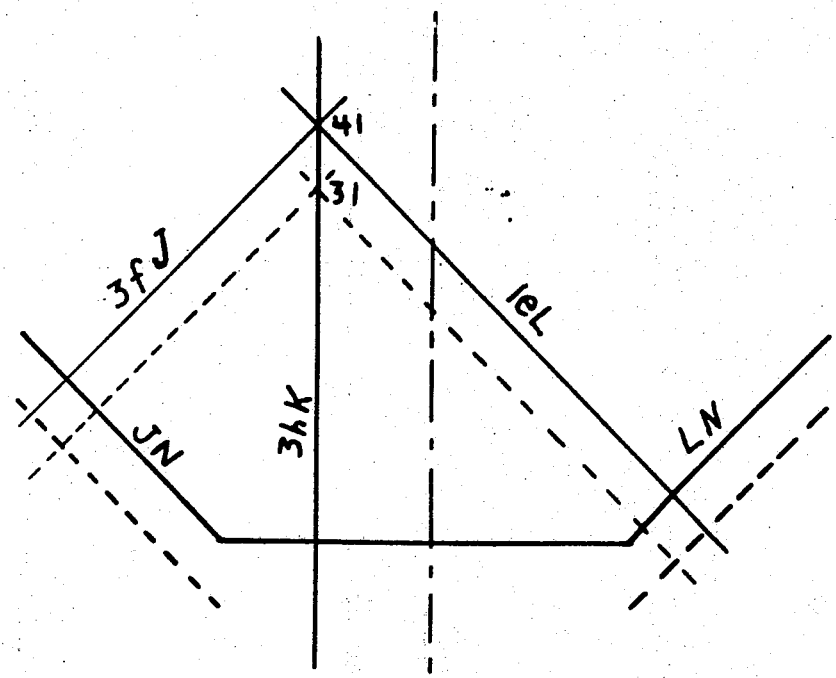
FIG. 13 is a geometrical construction illustrating a means of compressing points being reproduced.
Figure 14:
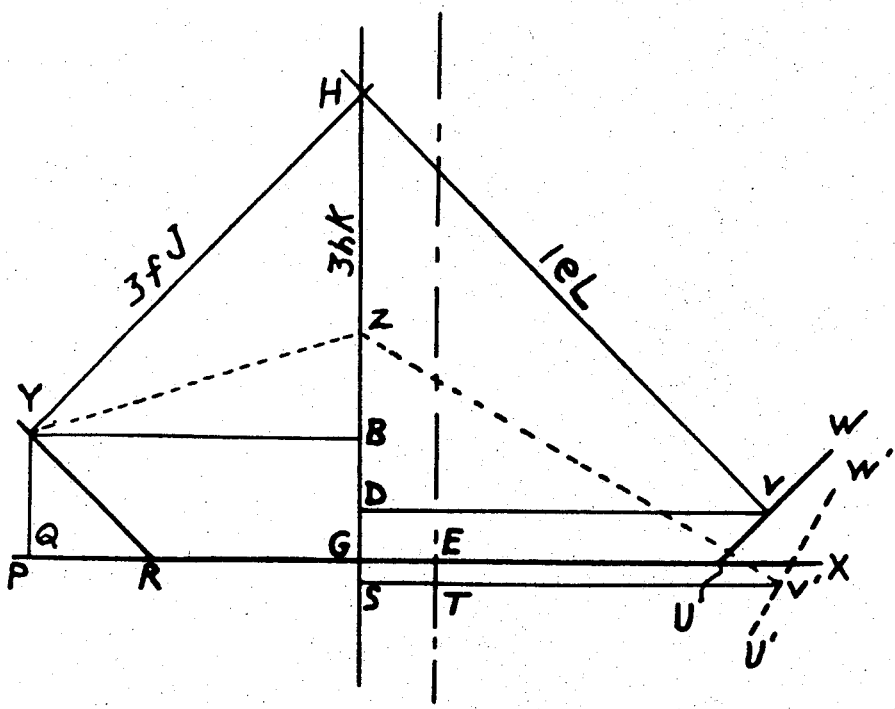
FIG. 14 is a geometrical construction illustrating means of compressing points being reproduced.

The method known from U.S. application, Ser. No. 424,433, having been recapitulated in part, following is a description of the variations and improvements to be claimed, as illustrated by FIGS. 12, 13 and 14.

In FIG. 8 it will be noticed that the two activated points of intersection 41 and 39 are farther from the surface KN, and from each other in a direction normal to KN, than is the case in FIG. 12. In FIGS. 8 and 12 the lines 3hK and 1hK have equivalent spacings, but the pair of lines 3fJ and 1fJ in FIG. 12 are closer to each other, and to surface KN, than is the case in FIG. 8. This is the result of their angle with surface KN being more acute, as well as a shift of the line of passage 3fJ along the axial line 3hK in the direction toward line 1fJ and surface KN. Similarly, lines of passage 3eL and 1eL are shifted with respect to each oter and to their axial position of intersection with lines of passage 3hK and 1hK. A combined effect is shown, but either making the acute angle of the diagonal lines with surface KN more acute, or shifting them in a direction along the radial lines 3hK or 1hK will have the same effect.

This effect is to compress the points 39 and 41, FIG. 8, to the positions 37 and 31, respectively, in FIG. 12. With a large number of lines, where all points of simultaneous intersection are compressed with respect to each other towards surface KN, without relative changes in the other two dimensions, this will result in a bas-relief effect giving an appearance of true three-dimensional reproduction, without the depth of differentially-photosensitive medium along the line 1hK or 3hK required by a reproduction that is proportional in all three dimensions. This is a very obvious advantage in reproducing a scenic view covering a wide expanse.

The lines projected by projector 11, FIG. 1, and shown reprojected (in two cases) in FIGS. 8 and 12, are indicated as parallel, but this need not be strictly so, as if the degree of divergence, in covering a large scene, is known, adjustment can be readily made. If a moving spot of radiation is projected along a line 12, FIG. 1, its position as line of reception 13 may be recorded by a scanning device rather than fixed on a photosensitive film, corrections made for compression as described above, and for varying degrees of refraction or other interfering deviations, and then reprojected for intersection with the radial line at the appropriate position in a transparent differentially-photosensitive material.

With reference to FIGS. 13 and 14, these are merely geometrical illustrations showing that methods of compression, as described, may be provided. In FIG. 13, point of intersection 41 is drawn back to 31 by withdrawing the line of projection 3$f$J and/or 1$e$L with a motion parallel to the center line, as shown by the broken lines.

In the case of FIG. 14, the following demonstrates the possibility of varying the angles and positions of the lines of reprojection as desired, in order to compress each point of the image. Line YH is at 45° to line PX in this illustration (this is not a necessary condition). Assume vertical (axial) distance of H from line PX is to be cut in half. E and T are points on the center line; EG, GR, RQ and vertical YQ are known distances; YB is parallel to PX; and angle $BYH$ is known. Axial distance of B from H is $YB$ tan angle $BYH = YB$ in this case (for simplicity), and is known; therefore HG is known. Required tangent of angle $$ZYB = \frac{(\tfrac{1}{2}GH) - YQ}{YB}$$

Similarly, in the case of the real, or hypothetical, masking plate UW on which H was recorded at V, and a particular desired angle $SZV'$ of reprojection, with intersection with line HS at point Z required, knowing lengths VD, GD and DH (from $VD$ tan angle $HVD$), the desired reposition of the plate U'V' so that $SV'/SZ$ = tan angle $SZV'$ may be arranged for reprojection through point V'.

The above are merely demonstrative and are not intended as limiting methods. Indeed it is possible to calculate innumerable lines of projection to give a point of intersection proportional to the original. For instance, line of projection 3$h$K may easily be rotated through 90° with its pivot point at Z.

Regarding variations in shade and color, consider line 12, FIG. 1, or the separate components 3$h$K and 1$h$K in FIGS. 8 and 12. These lines, in the reverse direction, may carry information from the object to a recording device, in the same way as a televised scene is obtained in two dimensions, with shade and color information. Other angles of viewing may be used to transmit this information, of course, but generally the straightforward view will be best. The information may be obtained as a direct reflection of the projected radiation, but as this radiation may be in the ultraviolet or infrared region, or be monochromatic, it may be best to record it separately, with an adjustment for any lag between the time information is received regarding contours by paths 13 and/or 14, FIG. 1, and the time information is received from the same region regarding shading and color. This information may be used to modify the intensity or frequency of radiation from any or all of the points on the reprojected lines.

Referring to FIG. 12, if the points farthest from viewing surface KN are most compressed, this will add realism, but for distant points it will be difficult to obtain contour lines. For these distant points it will be best to interpolate only a two-dimensional reproduction behind the nearer three-dimensional reproduction. This may be arranged by having a layer, shown as 30, FIG. 12, which is reflective or absorbent for oblique rays, and a layer 32 at the rear, which may be a screen, or a plane approximately parallel to surface KN, along which rays may be projected to produce activated points with axial rays such as 3$h$K and 1$h$K.

The original scene itself need not necessarily be scanned for shade or color, but a record such as a photograph could be scanned, in synchronization with the method of three-dimensional reproduction described. The usual reversal of quantity of energy received to that reprojected is an obvious requirement, in some cases.

As is mentioned above, in connection with a background picture, the method of intersecting rays is also adaptable to the production of a two-dimensional picture, without the use of contour lines, in a thin film inside the space occupied by a block of transparent differentially-photosensitive material, which is not itself a thin film. The two intersecting rays for this need not approach 90°, as was implied. One ray would normally be modulated as regards energy content by information received when scanning the scene for a record of shade and color, while the other, from a different non-adjoining source, could have a fixed energy content sufficient to activate said material, where the rays intersect simultaneously. However, more than two rays from different non-adjoining sources may be used on reprojection, and any or all of these rays may be modulated. In reprojection, the spacing and angle(s) between rays would be arbitrarily fixed to produce a smooth relatively flat surface of points of intersection. Normally this would be similar to a photograph embedded in plastic, but in some cases would be useful by obviating the necessity of reprojecting precisely on the plane of a thin surface, fixed with regard to a single projector.

Having described the invention, what is claimed as new is:

1. A method of three-dimensional photographic reproduction within the space occupied by a transparent differentially-photosensitive material, in which similarity of dimensions is maintained in the lateral dimensions, but compression is produced in depth to produce a bas-relief type of reproduction, which comprises projecting a plurality of light rays on to the three-dimensional shape to be reproduced, each ray covering a small area of the object, said light rays being generally distinct from each other where they impinge on the object to form primary lines, and being of sufficient number that substantially the entire surface to be reproduced in three dimensions is outlined by the plurality of separate rays; recording images of the resulting primary lines projected on the object, at more than one different angles, one of which angles may be that of original projection, and may be that of a virtual line, as secondary lines; reprojecting simultaneously at least two secondary lines produced by viewing a primary line at more than one different angles, one set only of secondary lines produced by recording a primary line, at any one instant, with the sheets of energy projected proportional to the cross-sectional shape of said secondary lines passing into the transparent differentially-photosensitive material, which must have adequate space in three dimensions to contain the resulting three-dimensional reproduction and not be merely a thin film, to intersect at points which are directly proportional in the two lateral dimensions, but compressed in depth, the additive energy from the projected secondary lines producing an effect which induces visibility within the space occupied by the transparent differentially-photosensitive material that is not produced by any one of the intersecting rays, within the time of said simultaneous projection; the above-mentioned secondary projections of views of a primary line are then extinguished, and another set of secondary lines, produced by viewing a primary line which was projected on a different area of the object than the preceding one, and its images recorded at more than one different angles, is projected along sheets of energy, at least one of said sheets being altered in the same fashion as the previous one to produce a disproportionate compression in depth, of points of intersection, with a similar position relative to the preceding activated line as the two primary lines were positioned on the original object, except for its compression in depth; the process is then continued, with primary lines covering surfaces of the object generally distinct from each other, each primary line being recorded at more than one different angles, and the resulting secondary lines being reprojected along sheets of energy to produce one line of intersection at a time within the space occupied by the transparent differentially-photosensitive material in similar relative shape and positions as the primary lines appeared on the original object, except for compression in depth, this multiplicity of lines where intersection occurs thus building up a three-dimensional surface of photographically altered material within the space occupied by the transparent differentially-photosensitive material, which outlines a bas-relief type of image appearing similar in shape to that of the original three-dimensional object, but compressed in depth to produce this illusion in a layer of transparent differentially-photosensitive material, which is not merely a thin film, and when the area of the scene to be reproduced is scanned to record variations in shade and color, which information may be used to modify the quality along one or more of the reprojected sheets of energy to produce proportional variations at points of intersection.

2. A method according to claim 1, where the transparent differentially-photosensitive material is a cast polyester plastic solidified with a peroxide catalyst.

3. A method according to claim 1, in which at least one oblique secondary line is recorded, with mechanisms attached to devices emitting pencils of energy external of the areas of the recordings of the secondary lines, thus causing the intersection pencils of energy to simultaneously sweep out the shapes of the sheets of energy of claim 1, thereby producing the same effect within the space occupied by the transparent differentially-photosensitive material.

4. A method according to claim 1, where no ray is controlled as to position by a contour line, but is fixed in constant relationship to any other ray from a different non-adjoining source, with which said ray intersects simultaneously within the body of the transparent differentially-photosensitive material, said material not being itself merely a thin film, but all intersecting rays having the same position relative to each other, so that the secondary rays are modulated only by the scanning effect for color and shade and produce a two-dimensional optically-altered thin film, without a bas-relief effect, inside said material by the points of intersection.

5. A method according to claim 3, where no ray is controlled as to position by a contour line, but is fixed in constant relationship to any other ray from a different non-adjoining source, with which said ray intersects simultaneously within the body of the transparent differentially-photosensitive material, said material not being itself merely a thin film, but all intersecting rays having the same position relative to each other, so that the secondary rays are modulated only by the scanning effect for color and shade and produce a two-dimensional optically-altered thin film, without a bas-relief effect, inside said material by the points of intersection.

References Cited
UNITED STATES PATENTS

| | | | |
|---|---|---|---|
| 3,085,923 | 4/1963 | Agnew | 156—58 |
| 3,338,766 | 8/1967 | Agnew | 156—58 |

VERLIN R. PENDEGRASS, Primary Examiner